United States Patent [19]

Senda et al.

[11] 4,362,629

[45] Dec. 7, 1982

[54] METHOD FOR PROCESSING SOLUTION INCLUDING HEAVY METAL

[75] Inventors: Atsuo Senda, Ootsu; Tohru Kasanami; Takuji Nakagawa, both of Kyoto, all of Japan

[73] Assignee: Murata Manufacturing Co., Ltd., Japan

[21] Appl. No.: 194,981

[22] Filed: Oct. 8, 1980

[51] Int. Cl.³ .............................................. C02F 1/62
[52] U.S. Cl. .................................. 210/714; 210/748; 210/757; 210/912
[58] Field of Search ............... 210/684, 748, 912, 714, 210/719, 721, 757

[56] References Cited

U.S. PATENT DOCUMENTS 3,686,115  8/1972  Forman et al. ...................... 210/748
4,055,491 10/1977  Porath-Furedi ................ 210/748 X
4,260,493  4/1981  Kretas et al. ................... 210/912 X

FOREIGN PATENT DOCUMENTS 51-86254  7/1976  Japan ................................. 210/912

*Primary Examiner*—Thomas G. Wyse
*Attorney, Agent, or Firm*—Ostrolenk, Faber, Gerb & Soffen

[57] ABSTRACT

A method for processing a waste solution used in a chemical plating process and including a heavy metal complex salt, a reducing agent, and a pH adjusting agent. The heavy metal complex salt is decomposed into a heavy metal component and a complexing agent component by applying ultrasonic vibration to the waste solution. The heavy metal component obtained by decomposition is in a powder state. Then the waste solution is filtered, so that the heavy metal component may be separated from the complexing agent component.

10 Claims, No Drawings

METHOD FOR PROCESSING SOLUTION INCLUDING HEAVY METAL

BACKGROUND OF THE INVENTION

1. Field of the Invention

The present invention relates to a method for processing a solution including heavy metal. More specifically, the present invention relates to a method for processing a waste solution produced from a plating process such as in a plating factory.

2. Description of the Prior Art

Generally, a chemical plating solution includes a heavy metal salt group, a complexing agent, a reducing agent and a pH adjusting agent. A plating solution for use in chemically plating copper includes, e.g., copper sulfate as the heavy metal salt group, EDTA or Rochelle salt as the complexing agent, formalin as the reducing agent, and sodium hydroxide as the pH adjusting agent.

When a plating process is ended using such a chemical plating solution, the plating solution is disposed as a waste solution. Heavy metal such as copper metal and a complexing agent are dissolved in the plating waste solution in the form of a complex salt, i.e. a heavy metal complex salt which is extremely stable.

A conventional method for processing a plating waste solution including heavy metal complex salt comprises (1) a method of using ion-exchange resin, (2) a method of using a calcium salt group of such as calcium hydrate, calcium chloride or the like, or other precipitant or flocculant, and the like.

However, the former method (1) can not remove the heavy metal in the complex salt. On the other hand, the latter method (2) is a method of adding a precipitant or flocculant in a waste solution, thereby to cause cohesion of a heavy metal complex salt, whereby the heavy metal complex salt is deposited. According to the latter method, most heavy metal is recovered in a state of sediment. The heavy metal which could not be included in the sediment is discharged by diluting the same using a large quantity of water to reduce the concentration of the heavy metal. Thus, the latter method (2) involves various shortcomings that the heavy metal component can not be completely removed, the sludge amount after processing is increased due to the fact that large amounts of various kinds of chemical agents are used, and therefore a problem of secondary pollution is caused, and so on. Furthermore, the latter method (2) leaves unsolved a problem of treatment of produced sludge. In addition, in view of the above described diluting process, the total amount of heavy metal being discharged is not changed after all. In this context, the latter method (2) is not a complete method of processing a plating waste solution.

Thus, conventionally it was very difficult to process a waste solution including a heavy metal complex salt, such as a chemical plating waste solution, by the above described various kinds of chemical methods, thereby to separate heavy metal from the heavy metal complex salt and to remove the same, due to the fact that the heavy metal complex salt is extremely stable. Therefore, it might be possible to process a waste solution including a heavy metal complex salt, by an electrochemical method such as an electrolytic extraction method. However, in such a case many other problems are involved in that large electric power is required, oxidation decomposition of a complexing agent also occurs, and the like. Thus, this method is not preferred.

SUMMARY OF THE INVENTION

According to the present invention, the above described conventional problems can be advantageously eliminated.

In brief, the present invention comprises a method of processing a waste solution including a reducing agent, and at least one of a heavy metal complex salt and a heavy metal salt, comprising the steps of adjusting pH of the solution, and applying ultrasonic vibration to the solution. According to the inventive method, in the case where a heavy metal complex salt has been solvated in the solution, the heavy metal complex salt is decomposed to become a heavy metal and a complexing agent, and completely separated. The separated heavy metal exhibits a powder state. On the other hand, by processing the solution including the heavy metal salt, a heavy metal component included in the heavy metal salt is separated from the heavy metal salt as a heavy metal in a powder state.

In a preferred embodiment of the present invention, ultrasonic vibration is applied to a chemical plating waste solution including a heavy metal salt group of such as copper, nickel, tin or the like, a complexing agent, a reducing agent, and a pH adjusting agent. As a result, a heavy metal complex salt including a heavy metal salt and a complexing agent is decomposed to a heavy metal component and a complexing agent component.

In another preferred embodiment of the present invention, the method further comprises the step of adding heavy metal powder in the solution being processed. The heavy metal powder being added is selected from powder of the same heavy metal as the heavy metal included in the solution being processed, or powder of metal of smaller ionization tendency than that of the heavy metal included in the solution.

Accordingly, a principal object of the present invention is to provide a simple processing method for separating a heavy metal component from a solution including a heavy metal complex salt or a heavy metal salt.

Another object of the present invention is to provide a processing method which can separate a heavy metal component from a solution including a heavy metal complex salt or a heavy metal salt, without using chemicals.

A further object of the present invention is to provide a method that can advantageously process a waste solution of a plating solution.

Still a further object of the present invention is to provide a processing method that can separate and purify heavy metal powder from a solution including a heavy metal complex salt or a heavy metal salt.

These objects and other objects, features, aspects and advantages of the present invention will becomes more apparent from the following detailed description.

DESCRIPTION OF THE PREFERRED EMBODIMENTS

The inventive method is advantageously utilized in processing a waste solution such as a chemical plating solution. The chemical plating solution contains a heavy metal salt, a complexing agent, a reducing agent and a pH adjusting agent. As the heavy metal salt, a metal salt of such as copper, nickel, tin or the like is used depending on desired metal to be plated. A heavy metal complex salt has been formed in a plating solution with the heavy metal salt and the complexing agent. The heavy metal complex salt is reduced when the same is brought in contact with the surface of a material to be plated as a function of the reducing agent, so that the heavy metal is deposited on the surface of the material. The pH adjusting agent serves to provide a pH condition suited for deposition of the heavy metal. The pH is selected to be a value which is suited for the heavy metal being deposited, which is different depending on the kind of the heavy metal.

A heavy metal complex salt, a reducing agent and a pH adjusting agent are contained in a waste solution of a plating solution after the same was used for plating. According to the inventive method, ultrasonic vibration is applied to the waste solution. As in the case of a plating process, the heavy metal is reduced and is deposited from the heavy metal complex salt as a function of the reducing agent in the step of applying ultrasonic vibration, when cavitation due to ultrasonic strongly influences, so that decomposition of the heavy metal complex salt is accelerated. As in the case of the plating process, existence of the pH adjusting agent provides a condition suited for reduction and deposition of a heavy metal from the heavy metal complex salt. The heavy metal decomposed and deposited from the heavy metal complex salt exhibits a powder state. Accordingly, upon completion of such processing steps, a pure heavy metal can be purified and separated from the waste solution. The waste solution is filtered, so that the heavy metal component may be separated from the complexing agent component. Thus, the heavy metal component and the complexing agent component can be separately recovered.

When ultrasonic vibration of 50 kHz is applied to a chemical copper plating waste solution of a copper containing amount of 900 ppm at a room temperature for four hours, copper powder is deposited and a dissolved copper concentration of the waste solution became 3.0 ppm.

On the other hand, a slight amount of copper powder was added to the above described plating solution or a slight amount of powder of metal of ionization tendency smaller than that of copper, such as of palladium, platinum, silver or the like and then ultrasonic vibration was applied in a room temperature. It was observed that after the lapse of thirteen minutes, the dissolved copper concentration has decreased to 1.8 ppm.

Thus, it was observed that the inventive method is effective as a method of processing a plating waste solution. In the following, the present invention will be described in more detail in conjunction with more specific examples.

EXAMPLE 1

A chemical copper plating waste solution of 1 liter prepared to contain 900 ppm copper, 3 g formalin and 25.0 g EDTA and to be pH 12.0 was poured in a breaker. Then copper powder of 1 g was added and was well stirred. Ultrasonic vibration of 50 kHz was applied to the waste solution at room temperature for 30 minutes using a commercially available ultrasonic vibrator.

At the beginning of application of ultrasonic vibration, the chemical copper plating waste solution exhibited a blue hue. After the lapse of 10 minutes while ultrasonic vibration is applied, the waste solution began to turn transparent. Within 30 minutes after ultrasonic vibration is being applied, liberated metal copper was deposited and a supernatant liquid became completely transparent.

Thereafter the waste solution was filtered so that the metal copper was separated. Measurement of concentration of copper dissolved in the waste solution as filtered revealed that the concentration is 1.8 ppm.

Then the filtered transparent waste solution is caused to pass through ion-exchange resin. As a result, copper was completely removed and copper was not detected at all even by atomic absorption spectrographic analysis. Furthermore, the EDTA in the waste solution was crystallized using sulfuric acid. When the same was filtered, 24.5 g of pure white EDTA crystals was obtained. No copper was detected at all even in the recovered EDTA crystals.

EXAMPLE 2

A chemical nickel plating solution of 1 liter prepared to contain 3700 ppm of nickel, 6 g of sodium hypophosphite and 50 g of sodium acetate and to be pH 4.0 was poured in a beaker. Then 1.0 g nickel powder was added and was well stirred. Then ultrasonic vibration of 28 kHz was applied to the waste solution at room temperature for 30 minutes using a commercially available ultrasonic vibrator.

At the beginning of application of ultrasonic vibration, the chemical nickel plating waste solution exhibited the hue of green. After the lapse of approximately 10 minutes after application of ultrasonic vibration, nickel began to be deposited. Within 30 minutes after ultrasonic vibration is being applied, a supernatant liquid of the waste solution became completely transparent.

The waste solution thus obtained was filtered so that nickel might be separated. Measurement of an amount of nickel as dissolved in the filtered waste solution revealed that the amount is 5 ppm. The dissolved nickel was able to be completely removed from the waste solution by using ion-exchange resin.

It is pointed out that the present invention can be applied not only to the above described waste solution of a chemical plating liquid but also to a waste solution used in an electroplating process. Although a heavy metal salt is contained in an electroplating liquid, no pH adjusting agent or reducing agent is contained in the liquid. Accordingly, in applying the present invention to such waste solution of an electroplating liquid, a pH adjusting agent of such as sodium hydroxide and a reducing agent of such as formalin are added to the waste solution and then ultrasonic vibration is applied. Even in such a case, by adding powder such as copper, nickel, palladium or the like, decomposition of heavy metal salt is accelerated. It is further pointed out that the present invention is not limited to a waste solution of a plating liquid and the present invention can also be applied to a waste solution containing a heavy metal complex salt or a heavy metal salt. Furthermore, the present invention can be applied not only to processing of a waste solution but also to purification of a pure heavy metal from a solution containing a heavy metal, besides such waste solution.

In applying ultrasonic vibration in accordance with the present invention, the higher the frequency of ultrasonic vibration, the faster decomposition of a heavy metal complex salt or a heavy metal salt progresses. In addition, the more the amount of metal powder being added, the faster decomposition of heavy metal complex salt or heavy metal salt progresses. However, it is pointed out that these conditions should not be construed to limit the scope of present invention.

The step of applying ultrasonic vibration may comprise the step of applying ultrasonic vibration from outside a container containing a solution being processed, the step of applying ultrasonic vibration from inside of the solution by placing an ultrasonic vibrator in the solution being processed, or the like.

Although the present invention has been described in detail, it is clearly understood that the same is by way of example only and is not to be taken by way of limitation, the spirit and scope of the present invention being limited only by the terms of the appended claims.

What is claimed is:

1. A method of processing a plating solution containing a reducing agent, and at least one copper or nickel heavy metal salt or complex, comprising the steps of adding heavy metal powder to said solution and applying ultrasonic vibration to said solution.

2. A method of processing a solution in accordance with claim 1, wherein:
said solution to which said ultrasonic vibration is applied is a waste solution of a chemical plating liquid containing a heavy metal salt, a complexing agent, a reducing agent, and pH adjusting agent.

3. A method of processing a solution in accordance with claim 1, wherein:
said solution to which said ultrasonic vibration is applied comprises a waste solution of an electroplating liquid containing a heavy metal salt, to which reducing agent and pH adjusting agent have been added.

4. A method of processing a solution in accordance with claim 1, wherein:
said heavy metal powder comprises powder of the same heavy metal as that of the heavy metal contained in said solution.

5. A method of processing a solution in accordance with claim 1, wherein:
said heavy metal powder comprises powder of metal of ionization tendency smaller than that of said heavy metal contained in said solution.

6. A method of processing a solution in accordance with claim 1, wherein the pH of said solution is adjusted to a value appropriate for reduction of said heavy metal.

7. A method of processing a solution in accordance with claim 6, wherein said heavy metal is copper.

8. A method of processing a solution in accordance with claim 6, wherein said heavy metal is nickel.

9. A method of processing a solution in accordance with claim 6, wherein said ultrasonic vibration is 28-50 kHz.

10. A method of processing a plating solution containing a reducing agent, and a copper salt or complex, comprising the step of:
applying ultrasonic vibration to said solution.

* * * * *